July 31, 1956  G. FRIEDMANN  2,757,047
PLANT FOR THE DISTRIBUTION OF FERTILIZING LIQUOR
Filed Aug. 31, 1953
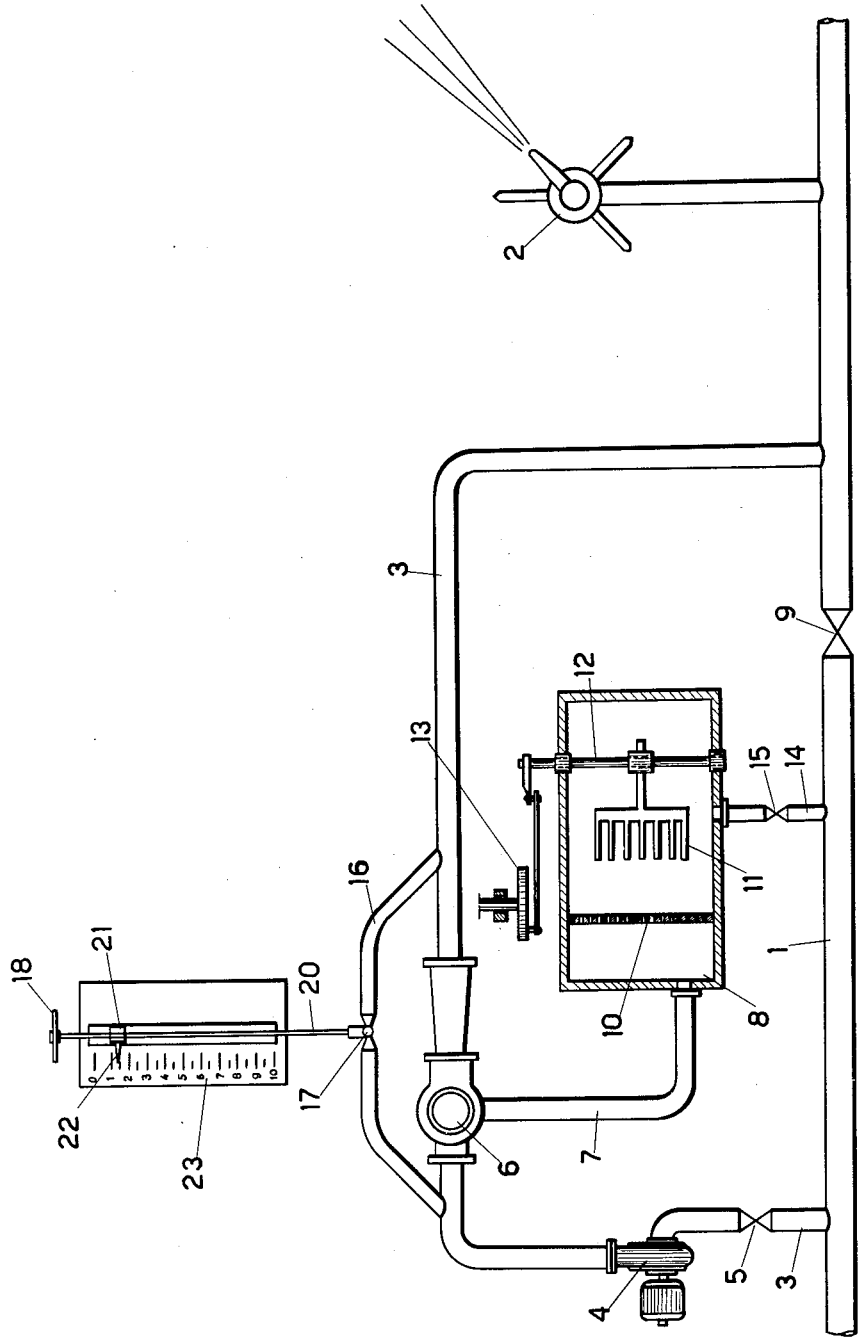
INVENTOR.
G. Friedmann
BY
Glasercke Downing Seebold
ATTYS.

United States Patent Office 2,757,047
Patented July 31, 1956

2,757,047
PLANT FOR THE DISTRIBUTION OF FERTILIZING LIQUOR

Giovanni Friedmann, Milan, Italy

Application August 31, 1953, Serial No. 377,653

Claims priority, application Italy April 18, 1953

4 Claims. (Cl. 299—84)

In plants for the irrigation of soils with diluted solution of natural manure, it is known to employ an injector in order to obtain said solution by introducing driectly into the water piping the needed quantity of drippings and of liquid manure obtained by diluting dung in water.

The simplest means of dosing such solutions would be adjusting the quantity of liquid manure sucked by the injector, by operating a valve placed in the piping through which the liquids are sucked.

However, in practice it is impractical to use such a valve, owing to the character of liquid manure, which is very dense and often carries along with it fragments of straw or the like, whereby the valve is easily clogged.

It is necessary therefore to adjust the quantity of flow of water, which in passing through the injector causes therein the desired aspiration in the pipe for liquid manure, said aspiration being a function of the quantity of water delivered through the injector. It would be sufficient, therefore, to provide a valve adapted to throttle the delivery of water before the injector or the delivery of the solution after the injector.

This solution however offers another inconvenience, because the irrigating and fertilizing solution is distributed on the soil by means of nozzles for spray irrigation, operation of which is influenced by the variations of pressure in the feed piping.

In order to obviate also this inconvenience, the plant according to the invention, which comprises a piping that feeds one or more spray nozzles and on which there is connected an injector whose aspiration pipe is connected with a tank containing the drippings or liquid dung obtained by diluting manure, is characterized by a branch pipe arranged in parallel on the injector, that is, in such a way as to bypass it, a throttling valve is provided in said pipe, connected to a device for indicating the concentration of the solution, as a function of the position of said valve.

To make the invention more fully clear, the accompanying drawing represents diagrammatically a plant having the aforesaid characteristic, merely by way of example.

In the drawing, 1 indicates a main piping which leads to one or more irrigating devices indicated at 2. From pipe 1 a pipe 3 branches off to bypass or jump throttling valve 9 in the main piping. A pump 4, a valve 5 and an injector 6, whose suction pipe 7 connects to a tank 8 are mounted between the two points of connection of the pipe 3 to the main piping 1, on the down stream side of valve 9 which is adapted to throttle or even to break the flow of water in the piping 1.

The tank 8 is divided into two parts by a grid baffle 10 and contains an agitating device of any type, which in the drawing is indicated as comprising a fork 11 made to oscillate about a pin 12 by any driving device 13.

Into the section of the tank where there is the agitator, it is possible to introduce water from the pipe 14 connected upstream of valve 9 in the piping 1. Pipe 14 is provided with a valve 15. The water introduced into the tank 8 by the pipe 14 is mixed with the dung which is introduced thereinto and the liquid dung formed passes through the grid 10 and is sucked by the pipe 7.

A bypass pipe 16 is connected with the pipe 3 before and after the injector 6 and is provided with a valve 17 so that if this is open, part of the water circulating in the pipe 3 can pass through the pipe 16 without passing through the injector 6. The valve 17 is governed by a small handwheel 18 connected to the stem of the valve by means of a rod 20 having a threaded portion of very long pitch, on which is provided a travelling nut 21 carrying an index 22. By turning the handwheel 18 to control the valve, the index 22 is thus displaced along the scale 23.

The plant hereinbefore described feeds water to the irrigators 2 with a pressure depending on the elastic pressure existing in the piping 1 and which may be diminished if desired by throttling the valve 9. If it is wished to deliver to the irrigators 2 a diluted fertilizer solution, one opens the valve 5 so that part of the water deviates through pipe 3 and sucks a certain quantity of liquid manure from the pipe 7. The quantity of water made to deviate into pipe 3 can be adjusted by shutting more or less the valve 9 which may even be shut totally, in which case all of the water passes through the pipe 3.

The quantity of liquid manure sucked and mixed with the water by the injector 6 is a function of the water delivery passing through said injector, but it will be easily understood that sufficiently accurate adjustment of said quantity cannot be obtained by means of a throttling of valve 9, because this is of considerable dimensions and is not adapted for precision adjustment; moreover in many cases it has to be totally shut and the pump 4 has to be actuated to obtain through the injector 6 the sufficient delivery, which often the pressure existing in piping 1 cannot provide.

The adjustment of delivery by way of the injector 6 is effected, therefore, by opening more or less the valve 17 that is by diminishing more or less the quantity of water that passes through the injector 6. This diminution of delivery through the injector does not involve any diminution of delivery to the irrigators 2, but, on the contrary, a slight increase of said delivery. On the scale 23 the graduation may be in figures representing the concentration of the solution thus obtained.

I claim:

1. In an irrigation system of the type described, including a main water supply pipe and a throttling valve in said main water supply, means for adding liquid manure to the irrigation water comprising a primary bypass around said throttling valve, an ejector in said bypass taking suction from a source of liquid manure, and a valve controlled secondary bypass around said injector.

2. The device of claim 1, in which a booster pump is provided in the primary bypass to increase the pressure to the injector.

3. The device of claim 2 in which the valve in said valve controlled secondary bypass is calibrated whereby the amount of liquid manure introduced into the irrigation water may be regulated.

4. The device of claim 2 in which the source of liquid manure comprises a tank divided into two separate compartments by a grid, one of said compartments being provided with an agitating device to stir up solid manure and water placed therein, the suction pipe from said injector being connected to the other of said compartments, and a valved water supply pipe to furnish water to said tank from the upstream side of the throttling valve in said main water supply pipe.

References Cited in the file of this patent

UNITED STATES PATENTS

| | | |
|---|---|---|
| 1,751,343 | Mack | Mar. 18, 1930 |
| 1,905,953 | Strasburger | Apr. 25, 1933 |
| 2,006,085 | Lehmkuhl | June 25, 1935 |
| 2,063,131 | Siems | Dec. 8, 1936 |
| 2,077,257 | Ofeldt | Apr. 13, 1937 |
| 2,233,965 | Strovink | Mar. 4, 1941 |